US012090111B2

(12) United States Patent
Cai

(10) Patent No.: US 12,090,111 B2
(45) Date of Patent: Sep. 17, 2024

(54) SEXUAL STIMULATION DEVICE

(71) Applicant: Dongguan Jindouyun Silicone Electronics Co., Ltd., Guangdong (CN)

(72) Inventor: Xuefei Cai, Dongguan (CN)

(73) Assignee: DONGGUAN JINDOUYUN SILICONE ELECTRONICS CO., LTD., Guangdong (CN)

( * ) Notice: Subject to any disclaimer, the term of this patent is extended or adjusted under 35 U.S.C. 154(b) by 968 days.

(21) Appl. No.: 17/103,839

(22) Filed: Nov. 24, 2020

(65) Prior Publication Data

US 2022/0160577 A1 May 26, 2022

(51) Int. Cl.
*A61H 19/00* (2006.01)
*A61H 23/02* (2006.01)

(52) U.S. Cl.
CPC ......... *A61H 19/34* (2013.01); *A61H 23/0263* (2013.01); *A61H 2201/1215* (2013.01); *A61H 2201/1409* (2013.01); *A61H 2201/5056* (2013.01)

(58) Field of Classification Search
CPC .. A61H 19/34; A61H 9/0057; A61H 23/0263; A61H 2201/149; A61H 2201/1676; A61H 2201/1669; A61H 2201/169; A61H 2205/087
See application file for complete search history.

(56) References Cited

U.S. PATENT DOCUMENTS

| | | | | |
|---|---|---|---|---|
| 5,377,701 A * | 1/1995 | Fang | A61H 9/005 132/271 |
| 10,792,214 B2 * | 10/2020 | Sedic | A61H 1/00 |
| 2017/0281457 A1 * | 10/2017 | Witt | A61H 9/005 |
| 2020/0085679 A1 * | 3/2020 | Haddock | A61H 19/44 |
| 2020/0188221 A1 * | 6/2020 | Lenke | A61H 9/005 |

FOREIGN PATENT DOCUMENTS

CN 108743300 A * 11/2018

* cited by examiner

*Primary Examiner* — Christine H Matthews
*Assistant Examiner* — Marc D. Honrath
(74) *Attorney, Agent, or Firm* — Leong C. Lei

(57) ABSTRACT

A sexual stimulation device includes a housing, a suction nozzle, a motor, an eccentric rod, and a connecting rod. The motor drives the eccentric rod to rotate. The eccentric rod drives the connecting rod to swing left and right to enable a stimulation member to swing left and right. The stimulation member swings left and right to squeeze the air in a space in the suction nozzle to generate an air vortex. The force generated by the air vortex is to perform 360° massage and stimulation on the female erogenous zone. It effectively enhances the user's experience, and it is easier for the user to have an orgasm.

10 Claims, 4 Drawing Sheets

SEXUAL STIMULATION DEVICE

BACKGROUND OF THE INVENTION

1. Field of the Invention

The present invention relates to a massage device, and more particularly to a sexual stimulation device.

2. Description of the Prior Art

An erogenous zone is an organ or zone of the body that is particularly sensitive to sexual stimulation. Female erogenous zone is more dispersed, such as the clitoris, breasts, labia minora, around the vaginal opening, around the anus, inner thighs, around the navel, lower abdomen, vulva, lips, tongue, ears, neck, underarms, buttocks, etc. The clitoris is the most sensitive to sexual stimulation and the most sensitive sexual organ in women, like a penis to be erected, and is particularly sensitive to touch. It can arouse more direct, rapid and intense sexual excitement, sexual pleasure and orgasm than other parts.

For this reason, there are various massage devices for stimulating female erogenous zone on the market. However, these massage devices generally use a driver to bring an object to directly act on the erogenous zone to achieve massage and stimulation, such as vibration, flapping, etc. This kind of massage has a poor experience. Accordingly, the inventor of the present invention has devoted himself based on his many years of practical experiences to solve these problems.

SUMMARY OF THE INVENTION

In view of the shortcomings of the prior art, the primary object of the present invention is to provide a sexual stimulation device which can effectively solve the problem of poor performance of the conventional massage device.

In order to achieve the above object, the present invention adopts the following technical solutions:

A sexual stimulation device comprises a housing, a suction nozzle, a motor, an eccentric rod, and a connecting rod. The suction nozzle is disposed on the housing and exposed outside the housing. The suction nozzle is made of a flexible material. The suction nozzle has a flared space with an opening facing outward. An inner bottom surface of the space is integrally provided with a stimulation member extending toward the opening of the space. A supporting portion is formed on a back of the stimulation member. The motor, the eccentric rod and the connecting rod are disposed in the housing. The eccentric rod is installed on an output shaft of the motor. An upper end of the connecting rod is connected to the eccentric rod. A lower end of the connecting rod is connected to the supporting portion. The motor drives the eccentric rod to rotate. The eccentric rod drives the connecting rod to swing left and right, enabling the stimulation member to swing left and right. The stimulation member swings left and right to squeeze air in the space to generate an air vortex.

Compared with the prior art, the present invention has obvious advantages and beneficial effects. Specifically, it can be known from the above technical solutions:

The motor drives the eccentric rod to rotate. The eccentric rod drives the connecting rod to swing left and right, enabling the stimulation member to swing left and right. The stimulation member swings left and right to squeeze the air in the space to generate an air vortex. The force generated by the air vortex is to perform 360° massage and stimulation on the female erogenous zone, instead of the traditional way that uses an object to directly act on the erogenous zone. It effectively enhances the user's experience, and it is easier for the user to have an orgasm and enjoy the pleasure better.

DETAILED DESCRIPTION OF THE PREFERRED EMBODIMENTS

Figure 1:
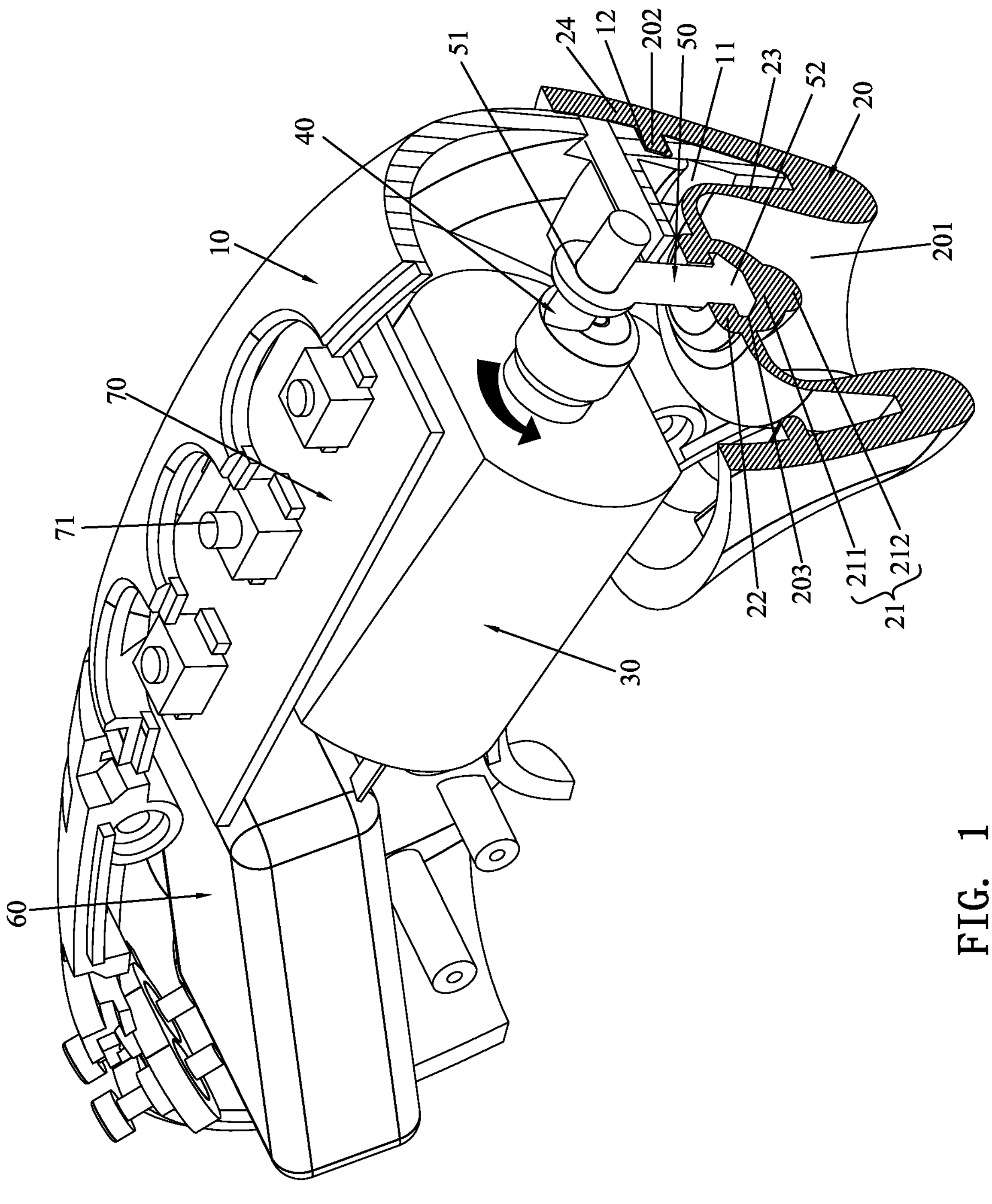
FIG. 1 is a partial cross-sectional view according to a preferred embodiment of the present invention in a first use state.

Referring to FIG. 1 through FIG. 4, a specific structure in accordance with a preferred embodiment of the present invention is shown, comprising a housing 10, a suction nozzle 20, a motor 30, an eccentric rod 40, and a connecting rod 50.

The housing 10 is made of a plastic material, and is in a curved shape. The housing 10 has a cavity 11 located at the end of the housing 10. The housing 10 is formed with an annular groove 12. The annular groove 12 is located on the upper periphery of the cavity 11.

The suction nozzle 20 is disposed on the housing 10 and exposed outside the housing 10. The suction nozzle 20 is made of a flexible material. The suction nozzle 20 has a flared space 201 with an opening facing outward. The inner bottom surface of the space 201 is integrally provided with a stimulation member 21 extending toward the opening of the space 201. A supporting portion 22 is formed on the back of the stimulation member 21. In this embodiment, the suction nozzle 20 is made of silicone. The suction nozzle 20 includes an inner ring 23 and an outer ring 24 that are integrally formed and connected with each other. The space 201 is defined in the inner ring 23. The stimulation member 21 and the supporting portion 22 are formed on the inner ring 23. The outer ring 24 is fixedly connected to the housing 10. The inner ring 23 is located in the cavity 11. The inner wall of the outer ring 24 is formed with an annular raised portion 202. The annular raised portion 202 is embedded and fixed in the annular groove 12. The stimulation member 21 includes a base 211 and a tail 212 protruding from the base 211. The base 211 and the tail 212 each have an outwardly curved cross section. The cross section of the base 211 is greater than the cross section of the tail 212. In addition, the distance from the opening of the space 201 to the stimulation member 21 is at least 4 mm, preferably 4-6 mm, so that the stimulation member 21 can swing in the space 201 better to prevent the stimulation member 21 from being blocked and can generate an air vortex well. The room outside the left and right sides of the stimulation member 21 is a downwardly enlarged structure. This ensures that the product can form an air vortex, and the strength of the air vortex is stronger to meet the needs of use. The inner diameter of the space 201 is reduced from the inner end to the outer end, and the thickness of the inner ring 23 is increased from the inner end to the outer end, thereby forming the downwardly enlarged structure.

The motor 30, the eccentric rod 40 and the connecting rod 50 are all disposed in the housing 10. The eccentric rod 40 is installed on the output shaft of the motor 30. The upper end of the connecting rod 50 is connected to the eccentric rod 40, and the lower end of the connecting rod 50 is connected to the supporting portion 22. The motor 30 drives the eccentric rod 40 to rotate. The eccentric rod 40 drives the connecting rod 50 to swing left and right, enabling the stimulation member 21 to swing left and right. The stimulation member 21 swings left and right to squeeze the air in the space 201 to generate an air vortex. In this embodiment, both the eccentric rod 40 and the connecting rod 50 are made of a hard material. The upper end of the connecting rod 50 has a connecting hole 51. The tail end of the eccentric rod 40 is inserted through the connecting hole 51. The lower end of the connecting rod 50 has a fixing portion 52. The supporting portion 22 is recessed with a fixing groove 203. The fixing portion 52 is embedded and fixed in the fixing groove 203.

The fixing portion 52 and the fixing groove 203 each have an inverse T-shaped configuration, which makes the connection more stable.

A battery 60 and a control board 70 are provided in the housing 10. The battery 60 and the motor 30 are electrically connected to the control board 70. The control board 70 controls the battery 60 to supply power to the motor 30 so that the motor 30 is turned on or off.

Figure 2:
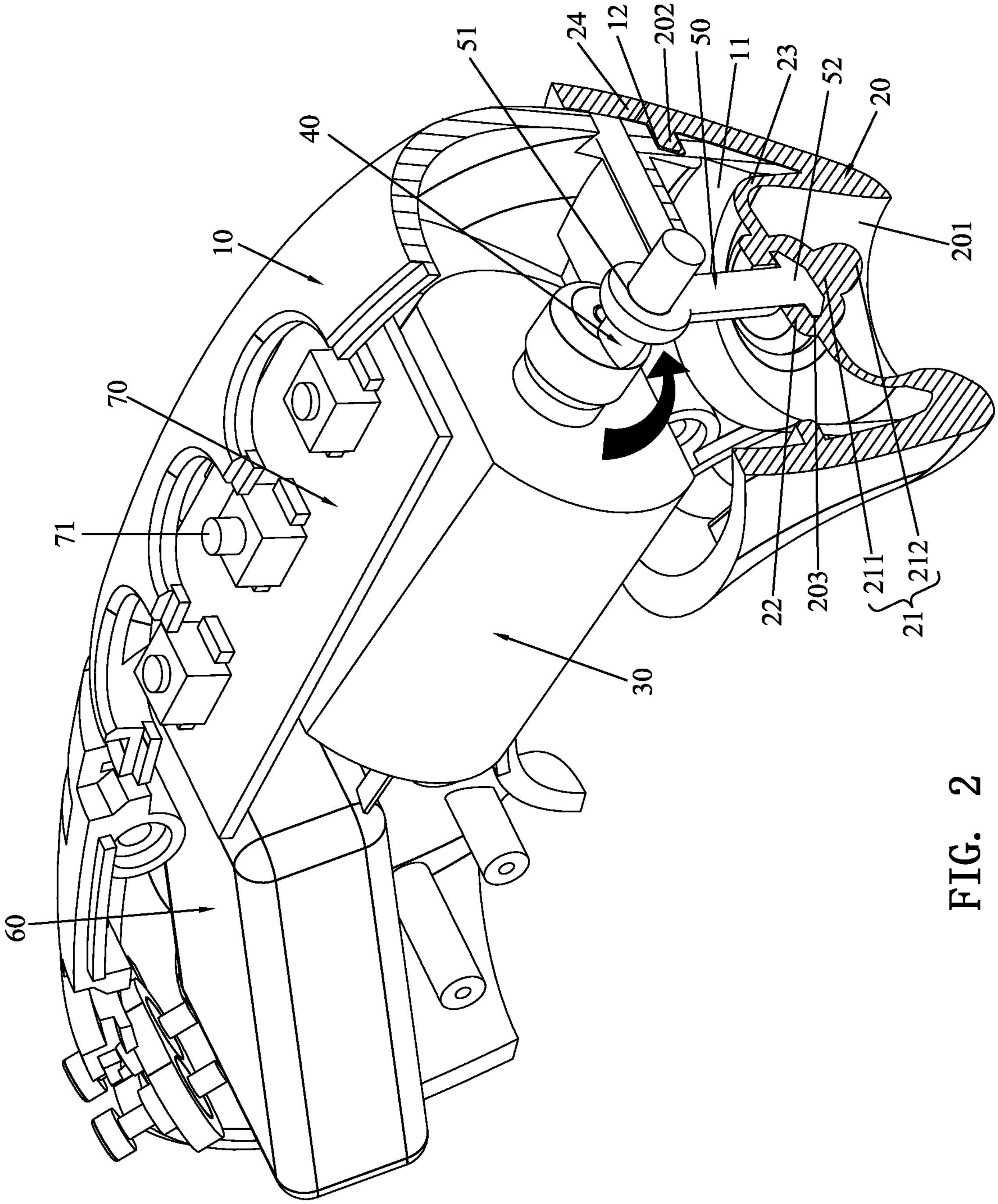
FIG. 2 is a partial cross-sectional view according to the preferred embodiment of the present invention in a second use state.
Figure 3:
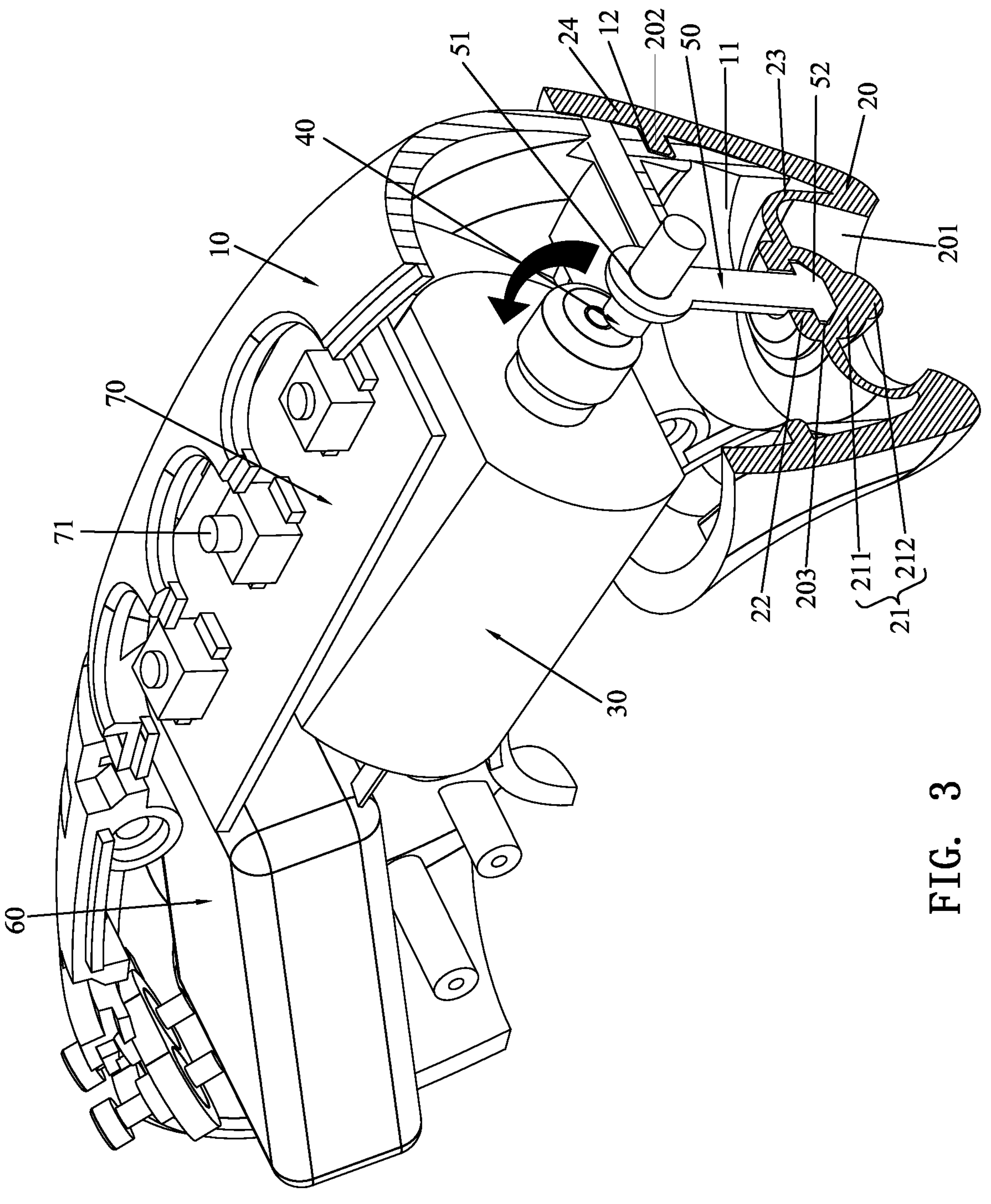
FIG. 3 is a partial cross-sectional view according to the preferred embodiment of the present invention in a third use state.
Figure 4:
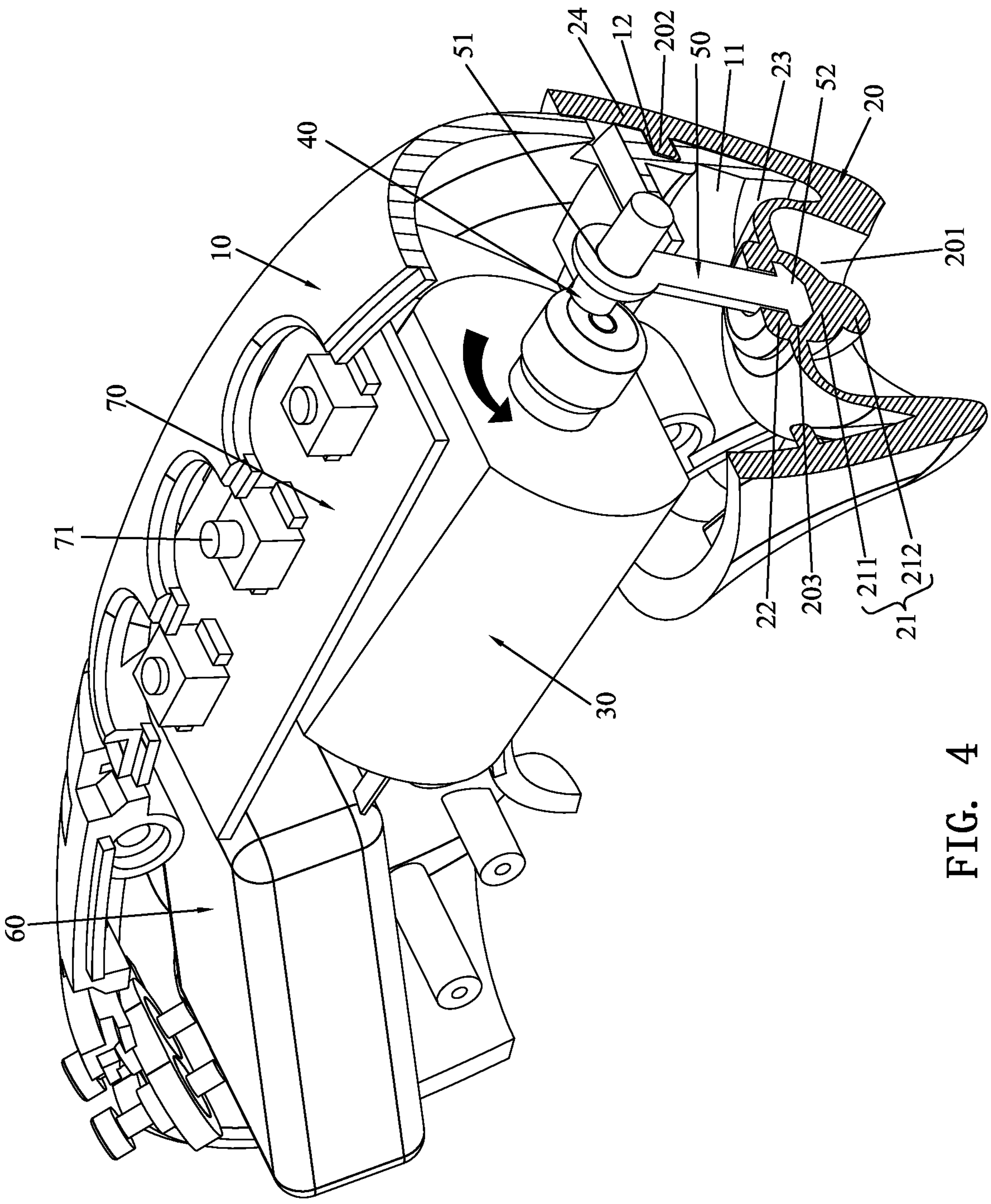
FIG. 4 is a partial cross-sectional view according to the preferred embodiment of the present invention in a fourth use state.

The working principle of this embodiment is described in detail as follows:

When in use, the suction nozzle 20 is pressed against the outer surface of the female sex organ to be retained thereon, so that the space 201 forms a closed space, and the clitoris faces the opening of the space 201. Next, the control switch 71 on the control board 70 is turned on so that the battery 60 supplies power to the motor 30. The motor 30 is activated and drives the eccentric rod 40 to rotate, so that the eccentric rod 40 drives the connecting rod 50 to swing left and right to enable the stimulation member 21 to swing left and right. The stimulation member 21 swings left and right to squeeze the air in the space 201 to generate air vortex. Specifically, taking FIG. 1 as the starting point of rotation, the stimulation member 21 is located in the center of the space 201, and the motor 30 starts to drive the eccentric rod 40 to rotate counterclockwise, so that the eccentric rod 40 starts to drive the connecting rod 50 to swing. As shown in FIG. 2, when the eccentric rod 40 rotates 90° counterclockwise, the connecting rod 50 will drive the stimulation member 21 to swing to the right. As shown in FIG. 3, when the eccentric rod 40 continues to rotate 90° counterclockwise, the stimulation member 21 will return to the center of the space 201 to generate blowing. As shown in FIG. 4, when the eccentric rod 40 continues to rotate 90° counterclockwise, the connecting rod 50 will drive the stimulation member 21 to swing to the left to generate suction. Suction and blowing are alternately generated so that the air in the space 201 forms an air vortex. The force generated by the air vortex is to massage and stimulate the clitoris, so that it is easier for the user to have an orgasm and enjoy the pleasure better. This product may be used to stimulate other erogenous zone, not limited to the clitoris.

The feature of the present invention is described below. The motor drives the eccentric rod to rotate. The eccentric rod drives the connecting rod to swing left and right, enabling the stimulation member to swing left and right. The stimulation member swings left and right to squeeze the air in the space to generate an air vortex. The force generated by the air vortex is to perform 360° massage and stimulation on the female erogenous zone, instead of the traditional way that uses an object to directly act on the erogenous zone. It effectively enhances the user's experience, and it is easier for the user to have an orgasm and enjoy the pleasure better.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. A sexual stimulation device, comprising: a housing, a suction nozzle, a motor, an eccentric rod, and a connecting rod; the suction nozzle being disposed on the housing and exposed outside the housing, the suction nozzle being made of a flexible material, the suction nozzle having a flared space with an opening facing outward, an inner bottom surface of the space being integrally provided with a stimulation member extending toward the opening of the space, a supporting portion being formed on a back of the stimulation member; the motor, the eccentric rod and the connecting rod being disposed in the housing, the eccentric rod being installed on an output shaft of the motor, an upper end of the connecting rod being connected to the eccentric rod, a lower end of the connecting rod being connected to the supporting portion, the motor driving the eccentric rod to rotate, the eccentric rod driving the connecting rod to swing left and right to enable the stimulation member to swing left and right with respect to a neutral position, and the stimulation member swinging left and right to alternately squeeze air left and right in the space to alternately induce blowing and suction at left and right sides of the neutral position so as to generate an air vortex.

2. The sexual stimulation device as claimed in claim 1, wherein a distance from the opening of the space to the stimulation member is at least 4 mm, and a room around the stimulation member is a downwardly enlarged structure.

3. The sexual stimulation device as claimed in claim 1, wherein the suction nozzle includes an inner ring and an outer ring that are integrally formed and connected with each other, the space is defined in the inner ring, the stimulation member and the supporting portion are formed on the inner ring, and the outer ring is fixedly connected to the housing.

4. The sexual stimulation device as claimed in claim 3, wherein the housing has a cavity, the inner ring is located in the cavity, the housing is formed with an annular groove, an inner wall of the outer ring is formed with an annular raised portion, and the annular raised portion is embedded and fixed in the annular groove.

5. The sexual stimulation device as claimed in claim 1, wherein the stimulation member includes a base and a tail protruding from the base, the base and the tail each have an outwardly curved cross section, and the cross section of the base is greater than the cross section of the tail.

6. The sexual stimulation device as claimed in claim 1, wherein the upper end of the connecting rod has a connecting hole, a tail end of the eccentric rod is inserted through the connecting hole, the lower end of the connecting rod has a fixing portion, the supporting portion is recessed with a fixing groove, and the fixing portion is embedded and fixed in the fixing groove.

7. The sexual stimulation device as claimed in claim 6, wherein the fixing portion and the fixing groove each have an inverse T-shaped configuration.

8. The sexual stimulation device as claimed in claim 1, wherein the suction nozzle is made of silicone.

9. The sexual stimulation device as claimed in claim 1, wherein a battery and a control board are provided in the housing, and the battery and the motor are electrically connected to the control board.

10. The sexual stimulation device as claimed in claim 1, wherein the connecting rod is made of a hard material.

* * * * *